US012609639B2

(12) United States Patent
Martinez

(10) Patent No.: US 12,609,639 B2
(45) Date of Patent: Apr. 21, 2026

(54) WALKING PAD ASSEMBLY

(71) Applicant: Pedro Martinez, Los Angeles, CA (US)

(72) Inventor: Pedro Martinez, Los Angeles, CA (US)

( * ) Notice: Subject to any disclaimer, the term of this patent is extended or adjusted under 35 U.S.C. 154(b) by 792 days.

(21) Appl. No.: 18/084,986

(22) Filed: Dec. 20, 2022

(65) Prior Publication Data

US 2024/0204695 A1 Jun. 20, 2024

(51) Int. Cl.
| | |
|---|---|
| *H02N 2/18* | (2006.01) |
| *E04F 15/08* | (2006.01) |
| *E04F 15/22* | (2006.01) |
| *H01L 41/113* | (2006.01) |
| *F21S 8/08* | (2006.01) |

(52) U.S. Cl.
CPC ........... *H02N 2/186* (2013.01); *E04F 15/082* (2013.01); *E04F 15/22* (2013.01); *H02N 2/181* (2013.01); *F21S 8/085* (2013.01)

(58) Field of Classification Search
CPC .... H10N 30/30; H10N 30/302; H10N 30/304; H10N 30/306; H10N 30/308
USPC ........................................................ 310/339
See application file for complete search history.

(56) References Cited

U.S. PATENT DOCUMENTS

| | | | |
|---|---|---|---|
| 7,902,727 B1 | 3/2011 | Sham | |
| 8,500,295 B2 | 8/2013 | Chang | |
| 8,800,390 B2 | 8/2014 | Weston | |
| 10,588,545 B2 | 3/2020 | Di Croce | |
| D943,520 S | 2/2022 | Takahashi | |
| 2002/0145350 A1 | 10/2002 | Henderson | |
| 2018/0123484 A1 | 5/2018 | Peace | |
| 2020/0111945 A1* | 4/2020 | Taketomi | H10N 30/30 |
| 2023/0240145 A1* | 7/2023 | Ridings | H10N 30/30 |
| | | | 310/314 |

FOREIGN PATENT DOCUMENTS

WO WO2016083294 6/2016

\* cited by examiner

*Primary Examiner* — Derek J Rosenau

(57) ABSTRACT

A walking pad assembly includes a plurality of floor pads that is each positionable on a floor. A plurality of generators is each integrated into a respective one of the floor pads for converting energy from being stepped upon into electrical energy. A plurality of electrical contacts is each is integrated into a respective one of the floor pads thereby facilitating the plurality of generators in each of the plurality of floor pads to be in communication with each other. A plurality of output ports is each integrated into a respective one of the floor pads and each of the output ports is in electrical communication with the generators in the respective floor pad. An energy storage unit is provided and a power cord for the energy storage unit is pluggable into a respective one of the output ports to store the electrical energy produced by the plurality of generators.

9 Claims, 8 Drawing Sheets

WALKING PAD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to walking pad device and more particularly pertains to a new walking pad device for converting pressure energy into electrical energy. The device includes a plurality of floor pads and a plurality of generators each integrated into the floor pads for converting energy from being walked upon into electrical energy. The device includes a power storage unit for storing the electrical energy.

(2) Description of Related Art Including Information Disclosed Under 37 CFR 1.97 and 1.98

The prior art relates to walking pad devices including a method for converting pressure energy into electrical energy with a piezoelectric material. The prior art discloses an energy saving illumination system that includes a piezoelectric floor, a revolving door and a light source. The prior art discloses a device for detecting contact in a monitored area which includes a piezoelectric sensor integrated into a floor panel that is walked upon for sensing a person walking on the floor panel. The prior art discloses a monitoring system that includes a floor covering with a sheet-type pressure sensor and a sensor control unit. The prior art discloses a piezoelectric generator device that includes a mechanical floor plate that comprises track mounted plates and electrical generators that are rotated when the track mounted plates are urged toward each other. The prior art discloses an energy harvesting device that includes a material that generates energy when moved from a pre-selected first position to a second position.

BRIEF SUMMARY OF THE INVENTION

An embodiment of the disclosure meets the needs presented above by generally comprising a plurality of floor pads that is each positionable on a floor. A plurality of generators is each integrated into a respective one of the floor pads for converting energy from being stepped upon into electrical energy. A plurality of electrical contacts is each is integrated into a respective one of the floor pads thereby facilitating the plurality of generators in each of the plurality of floor pads to be in communication with each other. A plurality of output ports is each integrated into a respective one of the floor pads and each of the output ports is in electrical communication with the generators in the respective floor pad. An energy storage unit is provided and a power cord for the energy storage unit is pluggable into a respective one of the output ports to store the electrical energy produced by the plurality of generators.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
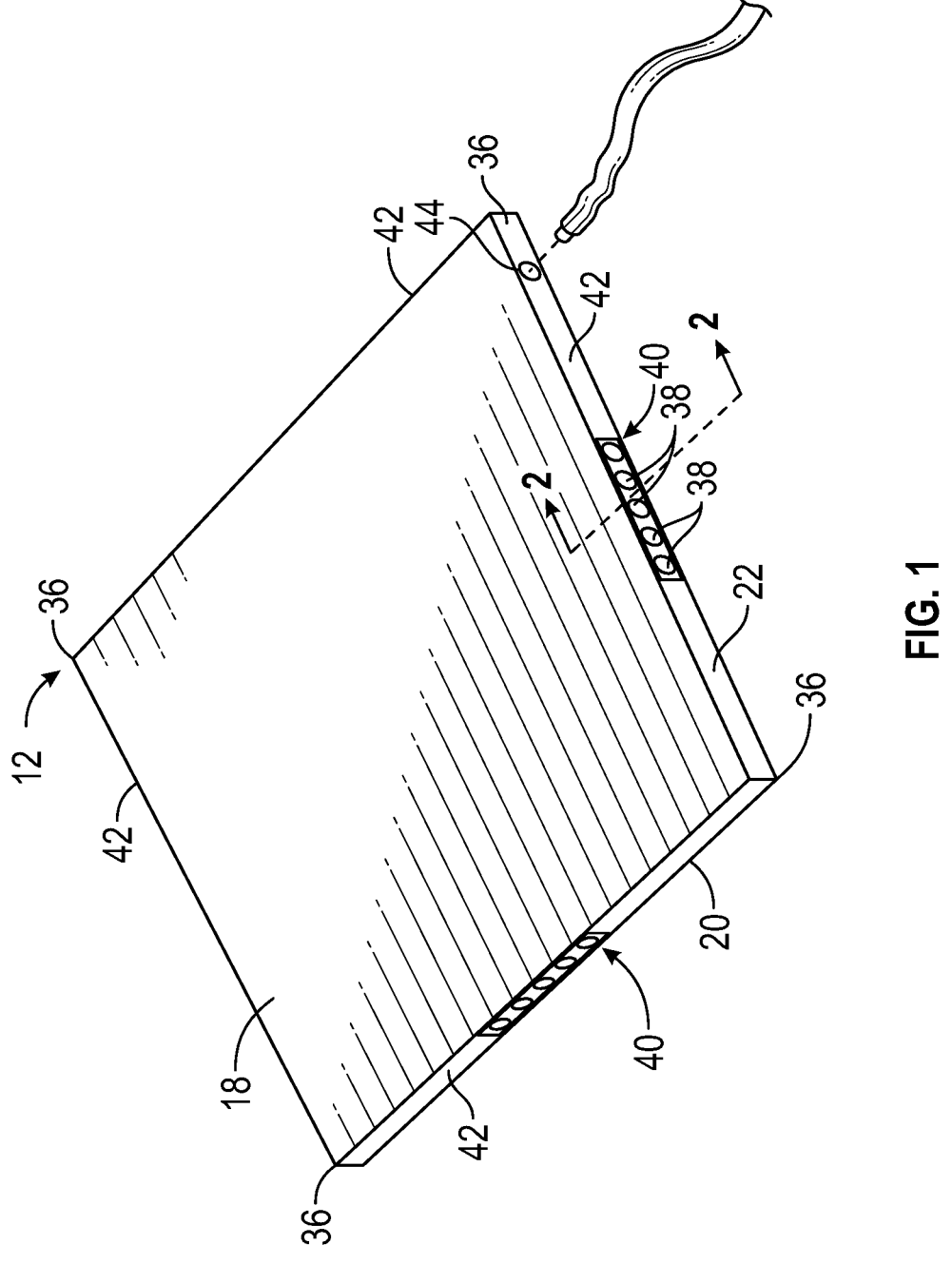
FIG. 1 is a top perspective view of a walking pad assembly according to an embodiment of the disclosure.
Figure 2:
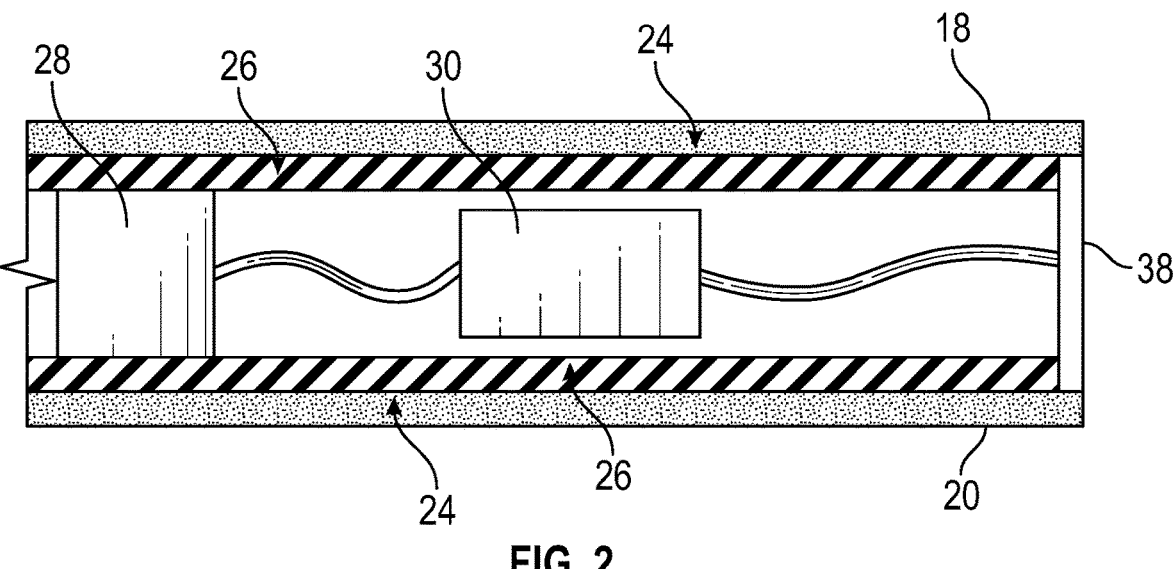
FIG. 2 is a cross sectional view taken along line 2-2 of FIG. 1 of an embodiment of the disclosure.
Figure 3:
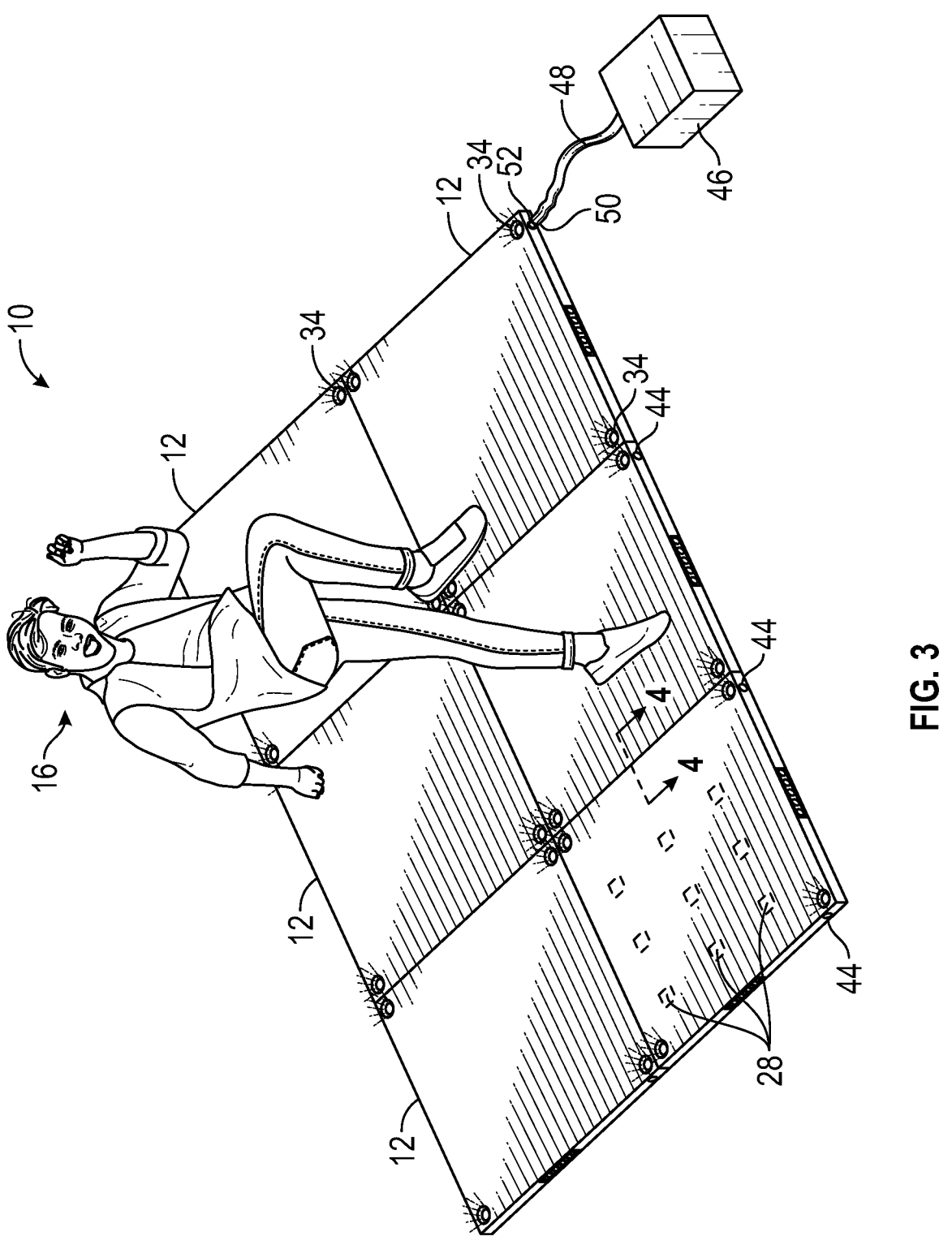
FIG. 3 is a perspective in-use view of an embodiment of the disclosure.
Figure 4:
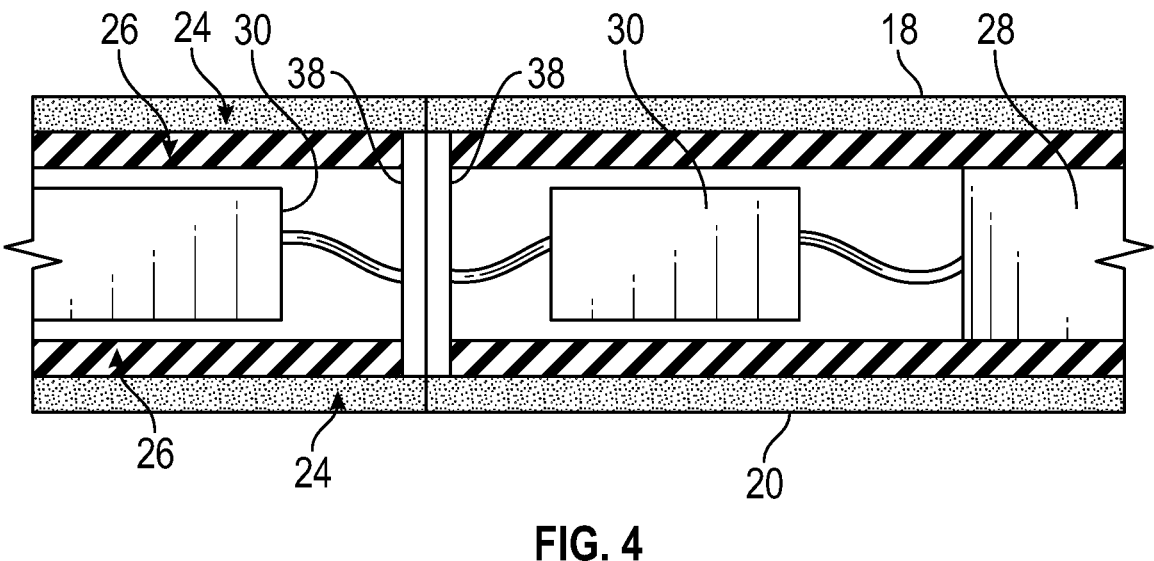
FIG. 4 is a cross sectional view taken along line 4-4 of FIG. 3 of an embodiment of the disclosure.
Figure 5:
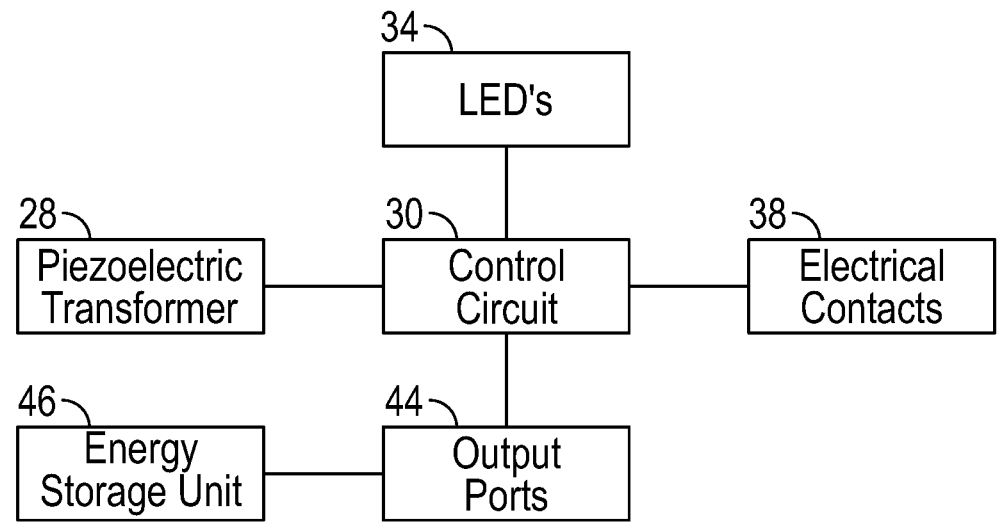
FIG. 5 is a schematic view of an embodiment of the disclosure.
Figure 6:
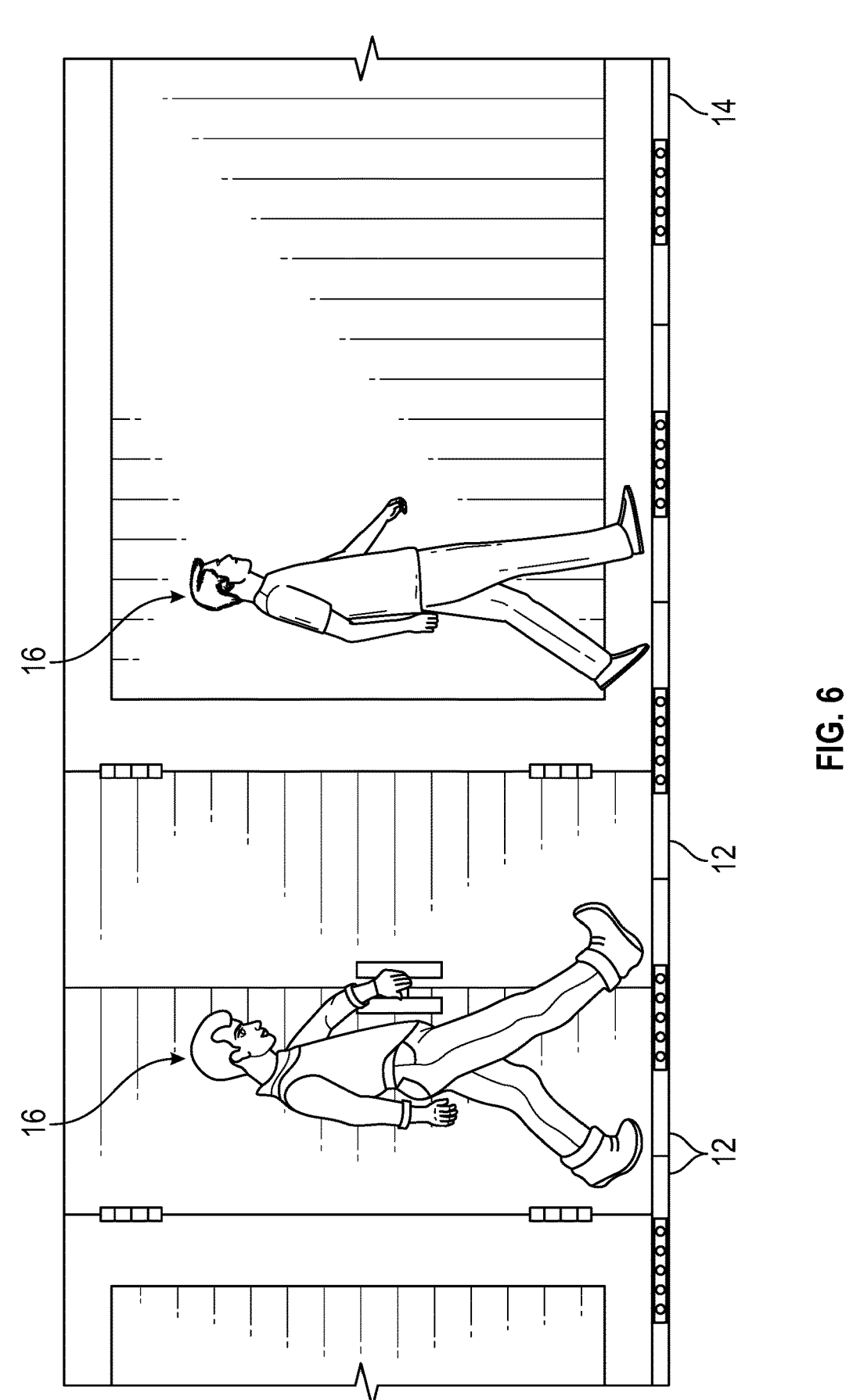
FIG. 6 is a perspective in-use view of an alternative embodiment of the disclosure.
Figure 7:
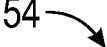
FIG. 7 is a schematic view of an alternative embodiment of the disclosure shown in FIG. 6.
Figure 7:
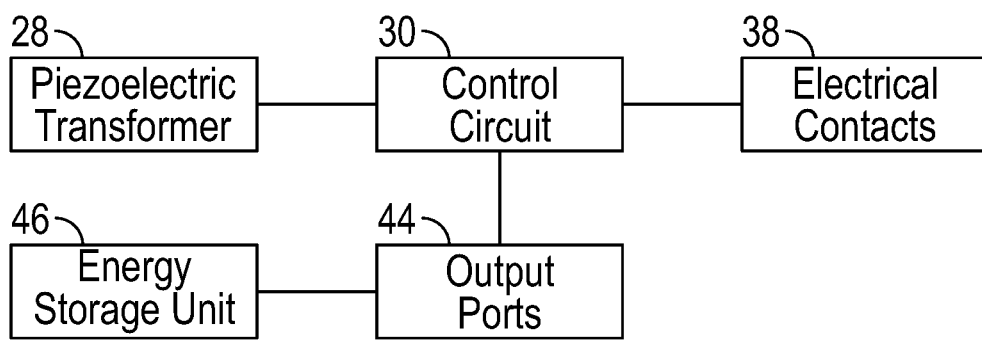

With reference now to the drawings, and in particular to FIGS. 1 through 9 thereof, a new walking pad device embodying the principles and concepts of an embodiment of the disclosure and generally designated by the reference numeral 10 will be described.

As best illustrated in FIGS. 1 through 9, the walking pad assembly 10 generally comprises a plurality of floor pads 12 that is each positionable on a floor 14 thereby facilitating the plurality of floor pads 12 to be walked upon by a user 16. The floor 14 may be a dance floor, a floor of a hallway, a floor in a room or any other floor upon which people will commonly walk. Each of the floor pads 12 has a top wall 18, a bottom wall 20 and a perimeter wall 22 extending between the top wall 18 and the bottom wall 20. Each of the top wall 18 and the bottom wall 20 comprises an outer layer 24 and an inner layer 26. The outer layer 24 is comprised of a granular mineral to resist being degraded from being walked upon. The granular mineral may include, but not be limited to, crushed quartz or other similar type of igneous rock. The inner layer 26 is comprised of a resiliently compressible material to deform from weight of the user 16 walking on the outer layer 24. The resiliently compressible material may include, but not be limited to, rubber or silicone.

A plurality of generators 28 is included and each of the plurality of generators 28 is integrated into a respective one of the floor pads 12. In this way each of the generators 28 is stepped upon when the user 16 walks on the respective floor pad 12. Each of the generators 28 converts pressure energy into electrical energy thereby converting energy from being stepped upon into electrical energy. Each of the plurality of generators 28 extends between the inner layer 26 of the top wall 18 and the inner layer 26 of the bottom wall 20 of the respective floor pad 12. Furthermore, each of the plurality of generators 28 in the respective floor pad 12 is spaced apart from each other and is strategically distributed in the respective floor pad 12. Each of the plurality of generators 28 may comprise a piezoelectric generator or other type of kinetic generator. A plurality of control circuits 30 is provided and each of the plurality of control circuits 30 is integrated into a respective one of the floor pads 12. Each of the plurality of generators 28 in the respective floor pad 12 is electrically coupled to the control circuit 30 in the respective floor pad 12.

A plurality of light emitters 34 is provided and each of the plurality of light emitters 34 is integrated into a respective one of the floor pads 12 to emit light outwardly from the respective floor pad 12. Each of the plurality of light emitters 34 in a respective one of the floor pads 12 is in electrical communication with the plurality of generators 28 in the respective floor pad 12. Additionally, each of the plurality of light emitters 34 is integrated into the outer layer 24 of the top wall 18 of the respective floor pad 12. Each of the plurality of light emitters 34 in the respective floor pad 12 is positioned adjacent to a respective one of four corners 36 of the perimeter wall 22 of the respective floor pad 12. Each of the plurality of light emitters 34 may comprise a light emitting diode or other type of electronic light emitter.

A plurality of electrical contacts 38 is provided and each of the plurality of electrical contacts 38 is integrated into a respective one of the floor pads 12. Respective ones of the electrical contacts 38 in the respective floor pad 12 is in electrical communication with respective ones of the electrical contacts 38 in an adjacent floor pad 12 when the plurality of floor pads 12 is positioned on the floor 14. In this way the plurality of generators 28 in each of the plurality of floor pads 12 is placed in communication with each other. The plurality of electrical contacts 38 in each of the floor pads 12 includes a plurality of sets of electrical contacts 40. Each of the sets of electrical contacts 40 in a respective one of the floor pads 12 is positioned on a respective one of four sides 42 of the perimeter wall 22 of the respective floor pad 12. Additionally, each of the plurality of electrical contacts 38 is comprised of an electrically conductive material, including but not being limited to, copper or gold.

A plurality of output ports 44 is provided and each of the plurality of output ports 44 is integrated into a respective one of the floor pads 12. Each of the plurality of output ports 44 in the respective floor pad 12 is electrically coupled to the control circuit 30 in the respective floor pad 12 such that each of the output ports 44 in the respective floor pad 12 is in electrical communication with the plurality of generators 28 in the respective floor pad 12. Each of the plurality of output ports 44 is positioned on a respective one of the four sides 42 of the perimeter wall 22 of a respective one of the floor pads 12. Additionally, each of the plurality of output ports 44 in the respective floor pad 12 is positioned adjacent to a respective one of the four corners 36 of the perimeter wall 22 of the respective floor pad 12.

An energy storage unit 46 is provided which has a power cord 48. The power cord 48 is pluggable into a respective one of the output ports 44 in a respective one of the floor pads 12 thereby facilitating the energy storage unit 46 to store the electrical energy produced by the plurality of generators 28. The power cord 48 has a distal end 50 with respect to the energy storage unit 46. The power cord 48 has a male plug 52 that is electrically coupled to the distal end 50 and the male plug 52 is electrically matable to the respective output port 44. The energy storage unit 46 may comprise a lithium ion battery or other similar type of high capacity, long term storage battery. In an alternative embodiment 54 as is most clearly shown in FIGS. 6 and 7, the plurality of light emitters 34 may be absent from the plurality of floor pads 12.

Figure 8:
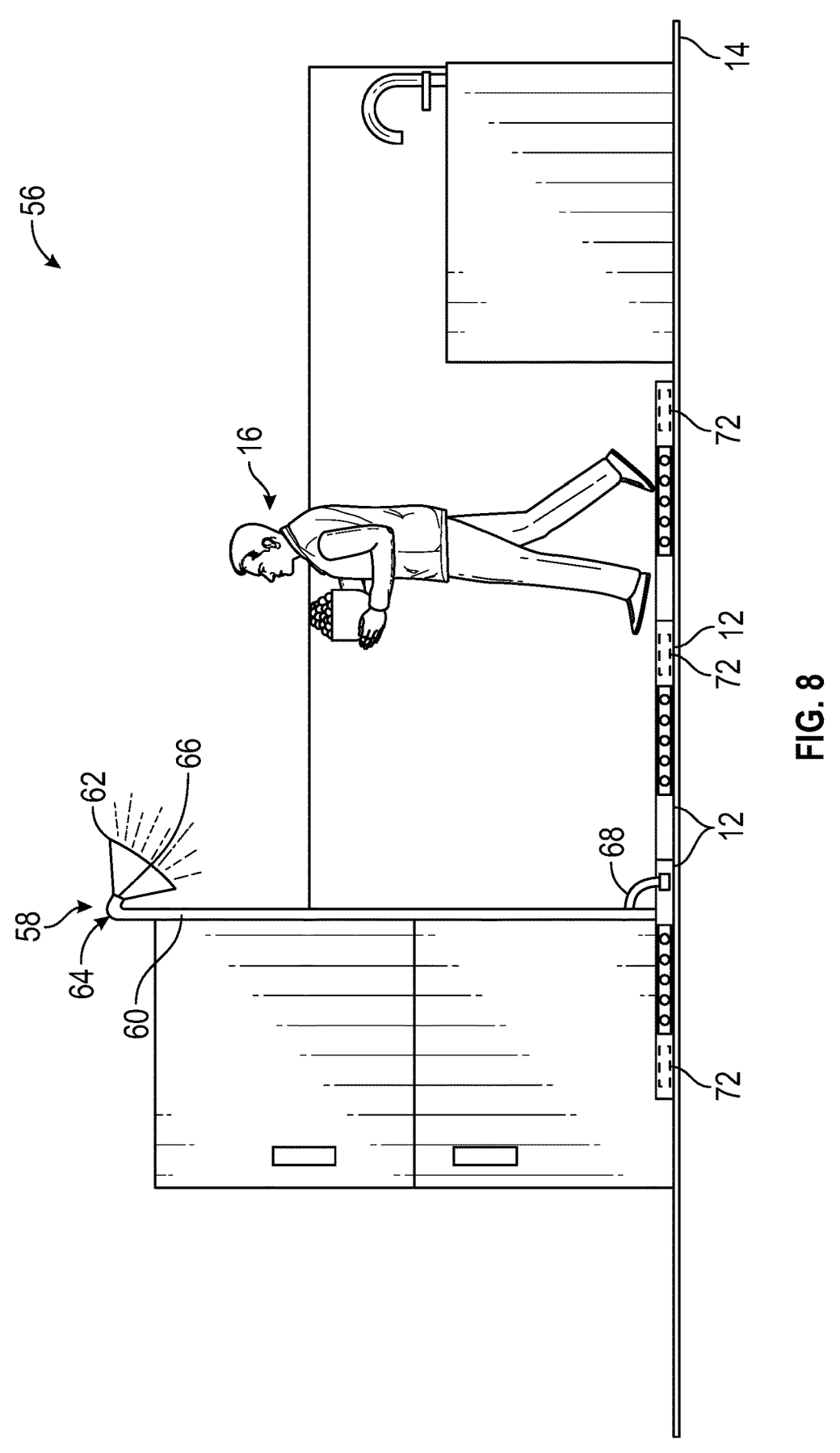
FIG. 8 is an in-use view of an alternative embodiment of the disclosure.
Figure 9:
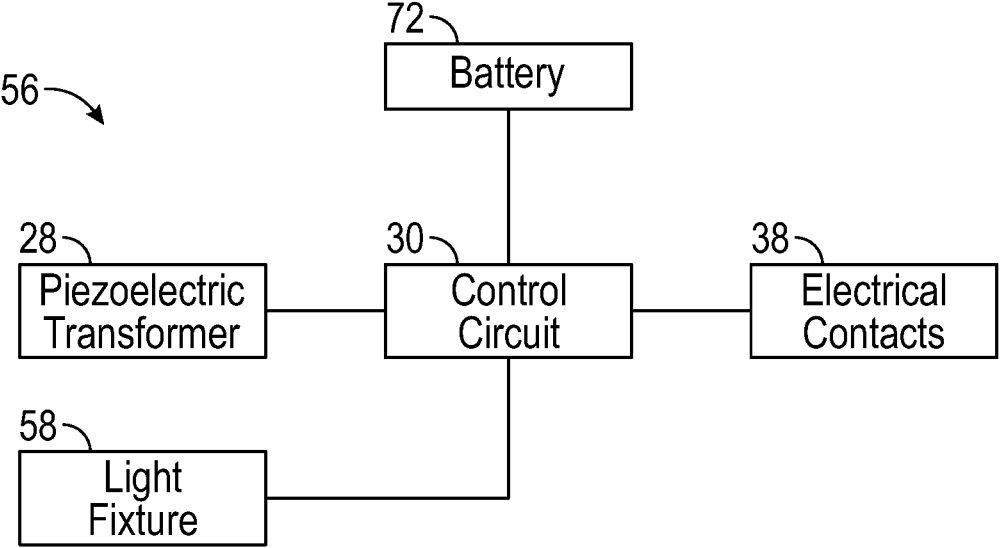
FIG. 9 is a schematic view of an embodiment of the disclosure shown in FIG. 8.

In an alternative embodiment 56 as is most clearly shown in FIGS. 8 and 9, a light fixture 58 is provided that has a pole 60 and a shade 62. The pole 60 is coupled to and extends upwardly from the outer layer 24 of the top wall 18 of a respective one of the floor pads 12. Additionally, the pole 60 has a bend 64 located adjacent to a distal end 66 of the pole 60 with respect to the top wall 18 such that the distal end 66 of the pole 60 is directed downwardly toward the respective floor pad 12. The shade 62 is positioned on the distal end 66 of the pole 60 and the light fixture 58 includes a light bulb, either incandescent or solid state, which is positioned in the shade 62. The light fixture 58 has a power cord 68 that is electrically coupled to the control circuit 30 in the respective floor pad 12 such that the light fixture 58 is powered by the electrical energy converted from being stepped on by the user 16. Continuing in the alternative embodiment 56 in FIGS. 8 and 9, a plurality of batteries 72 is each integrated into a respective one of the floor pads 12. Each of the batteries 72 is electrically coupled to the control circuit 30 in the respective floor pad 12 to store electrical energy produced by each of the plurality of generators 28 associated with the respective floor pad 12.

In use, a desired number of the floor pads 12 are positioned on the floor 14 in a desired arrangement such that the desired number of floor pads 12 is abutted against each other. In this way the electrical contacts 38 facilitate the plurality of generators 28 in the plurality of floor pads 12 to be connected into a circuit. Furthermore, the plurality of generators 28 converts the pressure energy from the user 16 stepping on the floor pads 12 into electrical energy. The power cord 48 of the energy storage unit 46 is plugged into a respective one of the output ports 44 in a respective floor pad 12 to facilitate the electrical energy produced by the plurality of generators 28 to be stored in the energy storage unit 46. In this way the electrical energy stored in the energy storage unit 46 can be utilized to supply electrical power for a variety of uses. The light emitters 34 in a respective one of the floor pads 12 are actuated when the user 16 steps on the respective floor pad 12 while the user 16 is dancing, for example.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A walking pad assembly for converting pressure force from walking into electrical energy, said assembly comprising:

a plurality of floor pads each being positionable on a floor wherein said plurality of floor pads is configured to be walked upon by a user;

a plurality of generators, each of said generators being integrated into a respective one of said floor pads wherein each of said generators is configured to be stepped upon when the user walks on said respective floor pad, each of said generators converting pressure energy into electrical energy wherein each of said generators is configured to convert energy from being stepped upon into electrical energy;

a plurality of light emitters, each of said plurality of light emitters being integrated into a respective one of said floor pads wherein each of light emitters is configured to emit light outwardly from said respective floor pad, each of said light emitters being in a respective one of said floor pads being in electrical communication with said plurality of generators in said respective floor pad;

a plurality of electrical contacts, each of said electrical contacts being integrated into a respective one of said floor pads, respective ones of said electrical contacts in said respective floor pad being in electrical communication with respective ones of said electrical contacts in an adjacent floor pad when said plurality of floor pads is positioned on the floor thereby facilitating said plurality of generators in each of said plurality of floor pads to be in communication with each other;

a plurality of output ports, each of said output ports being integrated into a respective one of said floor pads, each of said output ports being in electrical communication with said generators in said respective floor pad; and an energy storage unit having a power cord, said power cord being pluggable into a respective one of said output ports in a respective one of said floor pads thereby facilitating said energy storage unit to store the electrical energy produced by said plurality of generators.

2. The assembly according to claim 1, wherein:

each of said floor pads has a top wall, a bottom wall and a perimeter wall extending between said top wall and said bottom wall, each of said top wall and said bottom wall comprising an outer layer and an inner layer;

said outer layer being comprised of a granular mineral wherein said outer layer is configured to resist being degraded from being walked upon; and said inner layer being comprised of a resiliently compressible material wherein said inner layer is configured to deform from weight of the user walking on said outer layer.

3. The assembly according to claim 2, wherein each of said generators extends between said inner layer of said top wall and said inner layer of said bottom wall of said respective floor pad, each of said generators in said respective floor pad being spaced apart from each other and being strategically distributed in said respective floor pad.

4. The assembly according to claim 1, further comprising a plurality of control circuits, each of said plurality of control circuits being integrated into a respective one of said floor pads, each of said plurality of generators in said respective floor pad being electrically coupled to said control circuit in said respective floor pad.

5. The assembly according to claim 2, wherein each of said plurality of light emitters is integrated into said upper layer of said top wall of said respective floor pad, each of said plurality of light emitters in said respective floor pad being positioned adjacent to a respective one of four corners of said perimeter wall of said respective floor pad.

6. The assembly according to claim 2, wherein said plurality of electrical contacts in each of said floor pads includes a plurality of sets of electrical contacts, each of said sets of electrical contacts in a respective one of said floor pads being positioned on a respective one of four sides of said perimeter wall of said respective floor pad.

7. The assembly according to claim 4, wherein:

each of said floor pads has a top wall, a bottom wall and a perimeter wall extending between said top wall and said bottom wall; and each of said plurality of output ports in said respective floor pad is electrically coupled to said control circuit in said respective floor pad such that each of said output ports in said respective floor pad is in electrical communication with said plurality of generators in said respective floor pad, each of said output ports being positioned on a respective one of four sides of said perimeter wall of a respective one of said floor pads, each of said output ports in said respective floor pad being positioned adjacent to a respective one of said four corners of said perimeter wall of said respective floor pad.

8. A walking pad assembly for converting pressure force from walking into electrical energy, said assembly comprising:

a plurality of floor pads each being positionable on a floor wherein said plurality of floor pads is configured to be walked upon by a user, each of said floor pads having a top wall, a bottom wall and a perimeter wall extending between said top wall and said bottom wall, each of said top wall and said bottom wall comprising an outer layer and an inner layer, said outer layer being comprised of a granular mineral wherein said outer layer is configured to resist being degraded from being walked upon, said inner layer being comprised of a resiliently compressible material wherein said inner layer is configured to deform from weight of the user walking on said outer layer;

a plurality of generators, each of said generators being integrated into a respective one of said floor pads wherein each of said generators is configured to be stepped upon when the user walks on said respective floor pad, each of said generators converting pressure energy into electrical energy wherein each of said generators is configured to convert energy from being stepped upon into electrical energy, each of said generators extending between said inner layer of said top wall and said inner layer of said bottom wall of said respective floor pad, each of said generators in said respective floor pad being spaced apart from each other and being strategically distributed in said respective floor pad;

a plurality of control circuits, each of said plurality of control circuits being integrated into a respective one of said floor pads, each of said plurality of generators in said respective floor pad being electrically coupled to said control circuit in said respective floor pad;

a plurality of light emitters, each of said plurality of light emitters being integrated into a respective one of said floor pads wherein each of light emitters is configured to emit light outwardly from said respective floor pad, each of said light emitters being in a respective one of said floor pads being in electrical communication with said plurality of generators in said respective floor pad, each of said plurality of light emitters being integrated into said upper layer of said top wall of said respective floor pad, each of said plurality of light emitters in said respective floor pad being positioned adjacent to a respective one of four corners of said perimeter wall of said respective floor pad;

a plurality of electrical contacts, each of said electrical contacts being integrated into a respective one of said floor pads, respective ones of said electrical contacts in said respective floor pad being in electrical communication with respective ones of said electrical contacts in an adjacent floor pad when said plurality of floor pads is positioned on the floor thereby facilitating said plurality of generators in each of said plurality of floor pads to be in communication with each other, said plurality of electrical contacts in each of said floor pads including a plurality of sets of electrical contacts, each of said sets of electrical contacts in a respective one of said floor pads being positioned on a respective one of four sides of said perimeter wall of said respective floor pad;

a plurality of output ports, each of said output ports being integrated into a respective one of said floor pads, each of said plurality of output ports in said respective floor pad being electrically coupled to said control circuit in said respective floor pad such that each of said output ports in said respective floor pad is in electrical communication with said plurality of generators in said respective floor pad, each of said output ports being positioned on a respective one of said four sides of said perimeter wall of a respective one of said floor pads, each of said output ports in said respective floor pad being positioned adjacent to a respective one of said four corners of said perimeter wall of said respective floor pad; and an energy storage unit having a power cord, said power cord being pluggable into a respective one of said output ports in a respective one of said floor pads thereby facilitating said energy storage unit to store the electrical energy produced by said plurality of generators, said power cord having a distal end with respect to said energy storage unit, said power cord having a male plug being electrically coupled to said distal end, said male plug being electrically matable to said respective output port.

9. The assembly according to claim 8, further comprising a light fixture having a pole and a shade, said pole being coupled to and extending upwardly from said upper layer of said top wall of a respective one of said floor pads, said pole having a bend located adjacent to a distal end of said pole with respect to said top wall such that said distal end of said pole is directed downwardly toward said respective floor pad, said shade being positioned on said distal end of said pole, said light fixture having a power cord being electrically coupled to said control circuit in said respective floor pad wherein said light fixture is configured to be powered by the electrical energy converted from being stepped on by the user.

* * * * *